March 28, 1944. P. FERRIROLI 2,345,249
TELESCOPIC SIGHT MOUNT FOR RIFLES
Filed April 1, 1942 2 Sheets-Sheet 1

INVENTOR.
PETER FERRIROLI
BY George B White
ATTORNEY.

March 28, 1944. P. FERRIROLI 2,345,249
TELESCOPIC SIGHT MOUNT FOR RIFLES
Filed April 1, 1942 2 Sheets-Sheet 2

INVENTOR.
PETER FERRIROLI
BY George B. White
ATTORNEY.

Patented Mar. 28, 1944

2,345,249

UNITED STATES PATENT OFFICE 2,345,249

TELESCOPIC SIGHT MOUNT FOR RIFLES

Peter Ferriroli, San Francisco, Calif.

Application April 1, 1942, Serial No. 437,137

4 Claims. (Cl. 33—50)

This invention relates to a mount for telescopic sights for rifles and particularly, for the U. S. Army rifle. In the herein illustration, this mount for telescopic sights is shown on the U. S. Army rifle, model 1903, commonly referred to as the Springfield rifle.

The primary object of this invention is to provide a mount for telescopic sights which can easily replace the usual sight of the rifle and be securely held there in automatically aligned position without the necessity of resighting or changing, altering, drilling, or cutting of any part of the rifle.

It will be understood that various changes in the details of construction may be made without departing from the spirit or scope of the invention as defined by the appended claims.

With the foregoing and other objects in view, which will be made manifest in the following detailed description, reference is had to the accompanying drawings for the illustrative embodiment of the invention, wherein.

Figure 1:
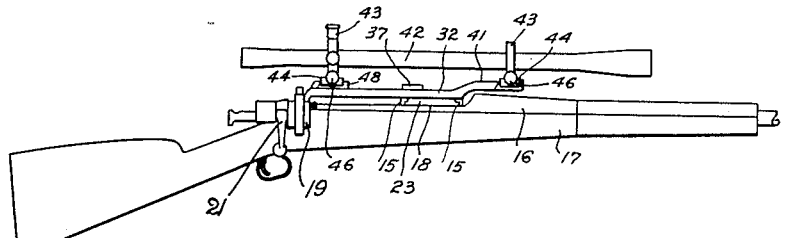
Fig. 1 is a side view showing any telescopic sight mount in assembled position on the rifle.
Figure 2:
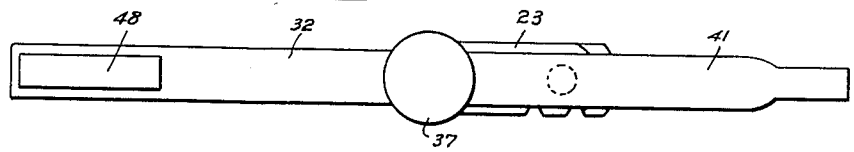
Fig. 2 is a top plan view of the telescopic sight mount.
Figure 3:
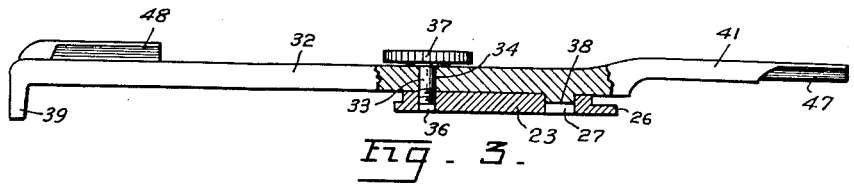
Fig. 3 is a side view, partly in section, of my mount for telescopic sights.
Figure 4:
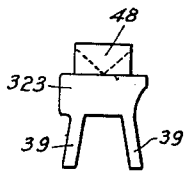
Fig. 4 is an end view of my mount for telescopic sight.
Figure 5:
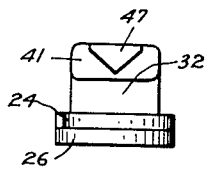
Fig. 5 is an end view viewing the mount from the muzzle end.
Figure 6:
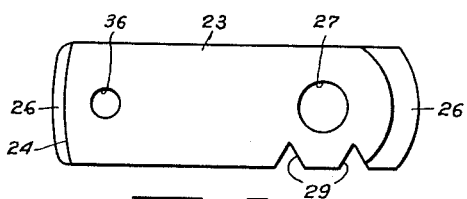
Fig. 6 is a detailed plan view of the base plate of the mount.
Figure 7:
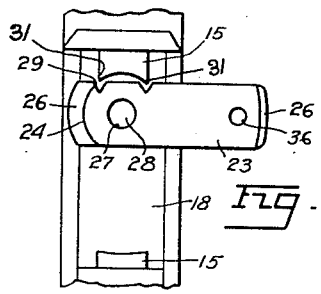
Fig. 7 is a plan view showing the base plate in position before it is turned under the sight base flanges.
Figure 8:
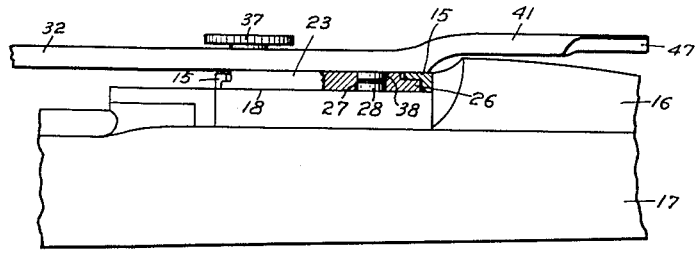
Fig. 8 is a side view, partly in section, of the arrangement of the mount on the rifle.
Figure 9:
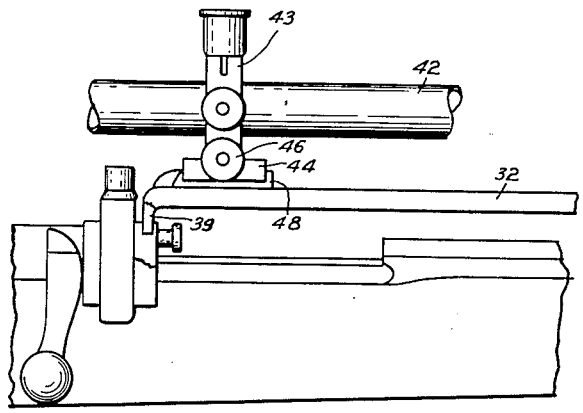
Fig. 9 shows the firing end of the mount assembled on the rifle.
Figure 10:
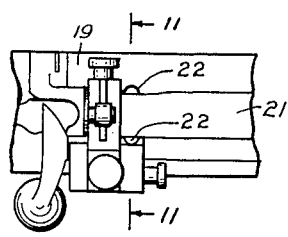
Fig. 10 is a fragmental plan view of the firing mechanism of the rifle, showing the arrangement of the cartridge clip stops.
Figure 11:
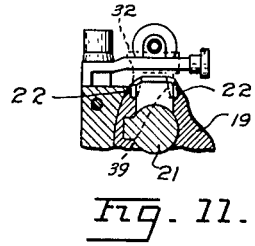
Fig. 11 is a fragmental sectional view of the rifle, the section being taken on the line 11—11 of Fig. 10.

In carrying out my invention, I make use of the standard U. S. Army rifle, in which usual sight base retaining flanges 15 are provided for the purpose of retaining the usual movable base of the customary adjustable sight for the rifle. These sight-retaining flanges 15 are arranged behind the hand guard 16 of the stock 17 of the rifle and in front of the usual receiver of the rifle. These retaining flanges 15 are spaced above a fixed base 18 so as to receive the flanges of the usual movable base plate of the sight. In the sleeve 19 through which the bolt mechanism 21 is guided in its reciprocation, are provided a pair of stop notches 22 for the purpose of holding the clip of the magazine during the loading of the rifle. These stop notches 22 are illustrated in detail in Figs. 10 and 11.

In the above, I described such parts of the rifle with which my novel mounting means for telescopic sights co-act. A movable base plate 23 of my sight mount is provided with arcuate ends 24 and correspondingly curved flanges 26 to fit against and under the respective side retaining flanges 15 of the rifle. A hole 27 in my sight base plate fits over the usual boss 28 which extends from the fixed sight band of the rifle. The hole 27 is so spaced from an end of my movable plate that the center of the hole 27 is substantially the center of the arc of the adjacent end 24 and of its flange 26, so as to allow the swinging of that end flange 26 under the adjacent sight retaining flange 15 by turning the movable base plate 23 around the boss 28 as a pivot, and also align the end 24 contiguously with the correspondingly curved edge of the retaining flange 15. Inasmuch as this base plate 23 is made so that its top is substantially contiguous with the level of the top of the forward retaining flange 15, I provide V shaped notches 29 on one side edge of the base plate 23 for clearing the corners 31 of the forward retaining flange 15 and allowing the turning of the base plate into longitudinal position between the retaining flanges 15.

A mounting bar 32 is connected to the base plate 23 by means of a screw 33 which extends through a hole 34 of the bar 32 and is threaded into a threaded hole 36 in the base plate 23. This screw 33 has a suitable head 37 for tightening or loosening the connection between the mount bar 32 and the base 23. The mount bar 32 also has a boss 38 extended from that side thereof which lies on the base 23. The boss 38 and the hole 34 in the bar 32 are so located that when the boss 38 is engaged with the hole 27 of the base plate 23, then the holes 34 and 36 are also in registry for receiving the screw 33. Thus, when the base plate is in position under the sight flanges 15, then a longitudinal alignment is assured by the fixed alignment between the bar 32 and the base plate 23.

The mount bar 32 extends toward the butt of the gun and over the firing mechanism of the gun and at its so-called firing end it is provided with a pair of legs 39 which fit into the notches 22 in the sleeve 19 of the rifle, which notches are normally used as cartridge clip stops. The legs 39 are so spaced from the boss 38 of the mount bar 32 that when the sight mount herein described is in position on the usual boss 28 and between the usual sight flanges 15, and when the legs 39 rests both on the bottom and against the sides of the clip-stopping notches 22 in the sleeve of the firing mechanism of the rifle, then the sight mount is truly aligned. The end of the bar 32 toward the muzzle end of the rifle is offset upwardly and this offset portion 41 is such that it clears the hand guard 16 and the stock 17 of the rifle. The legs 39 of the mount are of such length that there is a tension on the bar 32 between the legs 39 and the screw 33 when the screw is tightened down.

When the mounting device is in position so that the base plate 23 is located in the rear sight flanges 15, then the overlying portion of the mount bar 32 is in engagement with the top surface of the usual sight retaining flange 15. When the screw 37 is tightened, then the bar 32 is placed under firm tension because the base plate 23 is pulled up tight against the under side of the sight-retaining flanges 15 and the bar 32 is pulled tightly against the top surface of the forward sight-retaining flange 15 and, at the same time, the legs 39 are tightly wedged into the notches 22 of the cartridge clip stop and are pressed against the bottom of said notches 22. This automatically aligns the sight mount in the proper position without requiring any re-sighting and the mount is held in practically fixed position.

The means provided on the bar 32 for the attachment of the usual telescopic sights may vary in accordance with the type of supporting brackets, or holders usually provided with a standard telescope. In the herein illustration, arrangement is made for the securing in place of a telescope 42, the mounting brackets 43 of which are provided with dove-tailed holders 44 and set screws 46. On my mounting bar 32 the forward end 41 is formed in a triangular dove-tail end 47. On the other end of the bar 32 is provided a top dove-tail guide 48 of such heighth as to be accurately aligned with the dove-tail 47 on the offset end 41, when the bar 32 is in position on the rifle and under tension. The telescopic sight 42 therefore can be easily mounted on the mount bar 32 by sliding the respective dove-tails 44 of the mounting brackets 43 upon the corresponding dove tails 47 and 48 of the mount bar 32 and then by tightening the usual set screws 46 of the brackets 43, the telescope is automatically held in aligned and correct position on the rifle. It is to be noted that the mount bar 32 and base 23 may be handled as a unit with the telescopic sight and its supports, so that as and when it is necessary to use a telescopic sight on a rifle, then by quickly removing the normal removable sight plate and windage screw, the entire unit can be mounted by placing the hole 27 of the base plate 23 upon the usual sight base boss 28 and then by turning the whole assembly as a unit, so that both end flanges 26 of the base plate 23 are drawn under the usual sight-retaining flanges 15, and the legs 39 are properly engaged or dropped into the clip stop notches 22. Then, by turning the screw head 37 so as to tighten up the set screw 33, the entire assembly is clamped firmly into the proper position on the gun without the necessity of further adjustment. This also places the eye piece of the telescope in normal position for proper sighting, without a long overhanging unsupported portion of the telescope, as was necessary in connection with certain of the mounts heretofore used.

The use of my invention heretofore described facilitates the carrying and mounting of telescoping sights on the rifle and permits the provision of such assemblies, including the telescopic sight and its mount, as auxiliary equipment for the rifle, which may be carried separately and mounted on the rifle with great ease when needed. My invention also provides for a firm and accurate support of a telescopic sight without leaving a long portion of the telescopic sight near the eye unsupported. Furthermore, my mount does not require any alteration or drilling of the stock or any part of the rifle, it does not interfere with the normal operation of the rifle, it allows the convenient loading of the rifle, and it can be assembled on the rifle without in any way interfering with the usual rear sights in common use today, such as the Lyman rear-sight.

I claim:

1. In a mount for telescopic rifle sight for rifles having removable rear sight base turnable around a fixed pivot under retaining flanges, a removable base for the mount, end flanges on said mount base fitting under said retaining flanges so that when said mount base flanges engage the undersides of said retaining flanges the top of the mount base is substantially contiguous with the top of the retaining flanges, said mount base having an aperture therethrough engaging the base pivot around which said mount base is turnable into position for engagement with said retaining flanges, a mount bar, a locating stud extended from the mount bar into said pivot aperture of the mount base, and a set screw extended through said mount bar and threaded into said mount base for tightening the mount base and the mount bar against the opposite sides of the both of said retaining flanges, said mount base having a hole in it into which said set screw is threaded, said hole being so aligned with respect to said aperture as to locate said mount bar in alignment with said retaining flanges.

2. In a mount for telescopic rifle sight for rifles having removable rear sight base turnable around a fixed pivot under retaining flanges, and clip stopping recesses in the sleeve at the bolt of the rifle, a removable base for the mount, end flanges on said mount base fitting under said retaining flanges so that when said mount base flanges engage the undersides of said retaining flanges the top of the mount base is substantially contiguous with the top of the retaining flanges, said mount base having an aperture therethrough engaging the base pivot around which said mount base is turnable into position for engagement with said retaining flanges, a mount bar, a locating stud extended from the mount bar into said pivot aperture of the mount base, a set screw extended through said mount bar and threaded into said mount base for tightening the mount base and the mount bar against the opposite sides of the respective retaining flanges, an end of the mount bar being extended toward the butt end of the rifle, and legs extended from said end of the mount bar to extend into said usual clip stopping recesses in the usual sleeve of the rifle so as to truly align the mount bar on the rifle, the shape of said legs being such that the mount bar is held under tension between the legs and the set screw when the legs are forced into said recesses as the screw is tightened.

3. Means to secure a telescopic sight mounting bar on a rifle having retaining flanges for a usual sight base member and a fixed pivot for the turning of the usual sight base under said flanges, comprising a mount base fitting in place of the usual sight base member, means to clamp said mounting bar to said mount base and to draw parts of the mount base and of said mounting bar against opposite sides of the flanges for rigid engagement, said mount base having a pair of holes spaced one from the other longitudinally of said mount base, said fixed pivot having a bearing fit in one of said holes, a projection on said mount bar extended into one hole, and a securing element of said clamping means extending through said mount bar into the other of said holes.

4. A mount for telescopic rifle sights for rifles having retaining flanges for a sight base member and having cartridge stop notches at its bolt mechanism, comprising a mount base operatively fitting under said retaining flanges, a mount bar adapted to support a telescopic rifle sight and extended longitudinally of the rifle over said flanges and over said bolt mechanism and said stop notches, extensions on said mount bar extended into said stop notches, and means to clamp said mounting bar to said mount base and to draw said mount bar and said mount base against opposite sides of said retaining flanges and to simultaneously press said extensions into said stop notches for rigid engagement, the location of said extensions on the bar being such that the mount bar is held under tension between said extensions and said retaining flanges when said extensions are pressed into said stop notches as the clamping means is tightened.

PETER FERRIROLI.